(12) United States Patent
Le et al.

(10) Patent No.: US 6,370,239 B1
(45) Date of Patent: Apr. 9, 2002

(54) STANDALONE TELEPHONE ANSWERING MACHINE WITH STORE AND FORWARD FACSIMILE

(75) Inventors: Diep H. Le, Lake Forest; Sirisak Adulratananuwat, Walnut; Stanton Christopher Renna, Costa Mesa, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/349,670

(22) Filed: Jul. 8, 1999

(51) Int. Cl.[7] .......................... H04M 11/00; H04N 1/32
(52) U.S. Cl. .................... 379/100.09; 358/442
(58) Field of Search .......... 379/100.01, 100.03–100.06, 379/100.08, 100.09, 100.12, 100.14; 358/400–403, 407, 434, 436, 438–440, 442, 468

(56) References Cited

U.S. PATENT DOCUMENTS 5,790,640 A * 8/1998 Tassa et al. ............ 379/100.15
5,841,843 A * 11/1998 Bristow et al. ........ 379/100.09

* cited by examiner

*Primary Examiner*—Wing F. Chan
(74) *Attorney, Agent, or Firm*—Lyon & Lyon LLP

(57) ABSTRACT

A store and forward facsimile function is incorporated into a standalone telephone answering machine. The facsimile function automatically interfaces with all PC facsimile application software to retrieve data representing fixed graphic material, the facsimile messages, stored in the memory of the telephone answering machine. Flash memory storage of the telephone answering machine is used to store the received facsimile messages. A facsimile LED on the unit blinks to indicate the number of facsimile messages that are stored in memory. A FAX upload button on the machine initiates uploading of the stored facsimile messages to the user's PC through a DTE/DCE interface. The processor in the telephone answering machine sends a simulated ring signal to the facsimile application software in the PC to activate it into uploading the facsimile messages stored in memory, according to FAX CLASS 2 protocol. When the telephone answering machine is in standalone mode, incoming facsimile messages will be stored in the memory of the telephone answering machine. The modem used in the standalone telephone answering machine switches from idle to voice active mode or facsimile active mode in response to hardware flow control signals on the DTE/DCE interface and a received facsimile calling tone.

20 Claims, 3 Drawing Sheets

STANDALONE TELEPHONE ANSWERING MACHINE WITH STORE AND FORWARD FACSIMILE

BACKGROUND OF THE INVENTION

1. Field of the Invention

The present invention relates generally to improvements in the reception of facsimile messages by computing devices that are capable of executing facsimile software like personal computers (PC's) for example, and more particularly pertains to new standalone, store and forward facsimile apparatus wherein facsimile messages may be received by the apparatus during times that the communication application software of the PC is not in use.

2. Description of Related Art

Standalone facsimile modems that are utilized in connection with PCs that contain facsimile application programs to receive and send facsimiles employ proprietary facsimile application software in the PC and proprietary software in the facsimile modem to interface with the application software. Such an arrangement has been unsatisfactory in that the standalone facsimile modem is limited in its use with the specific proprietary application software for which it is designed and cannot be universally used with all facsimile application software. Although a universal application standalone facsimile modem apparatus is a highly desired goal, such goal has not been obtained until the present invention.

SUMMARY OF THE INVENTION

The store and forward facsimile feature incorporated into a standalone telephone answering machine automatically interfaces with all facsimile application software on the market today. The store and forward feature simulates an incoming ring signal to initiate operation of the facsimile application software. Uploading of facsimile messages from the standalone telephone answering machine is initiated by the user, by the push of a button. Facsimile messages are received and stored to the memory of the telephone answering machine during the time that the facsimile application software is not in use, for example when the computing device is shut-off or is busy with another application.

BRIEF DESCRIPTION OF THE DRAWINGS

The exact nature of this invention, as well as its objects and advantages, will be readily apparent from consideration of the following specification when considered in conjunction with the accompanying drawings, in which like reference numerals designate like parts throughout the figures thereof, and wherein.

DETAILED DESCRIPTION OF THE PREFERRED EMBODIMENTS

Figure 1:
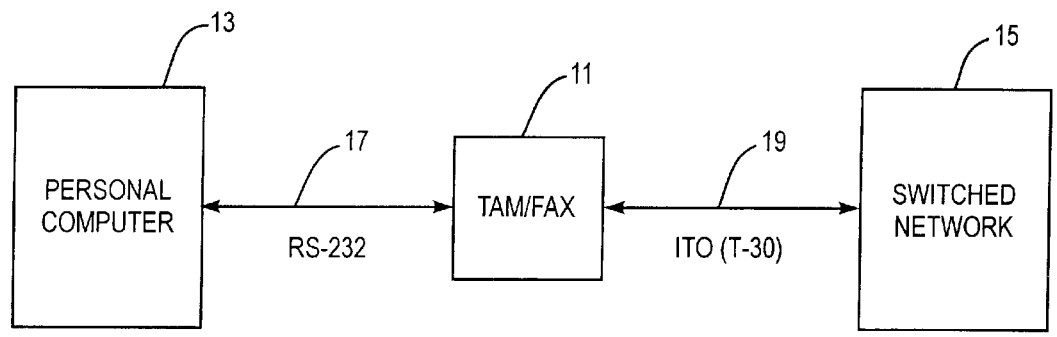
FIG. 1 is a block diagram showing use of the invention in a system.
Figure 2:
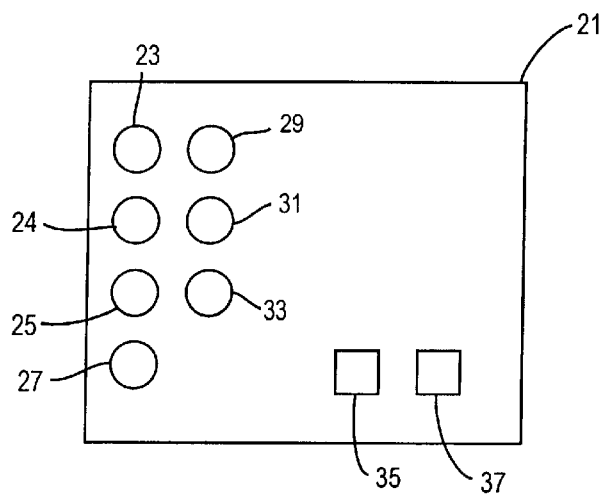
FIG. 2 is an illustration of the controls on the apparatus incorporating the invention.
Figure 3:
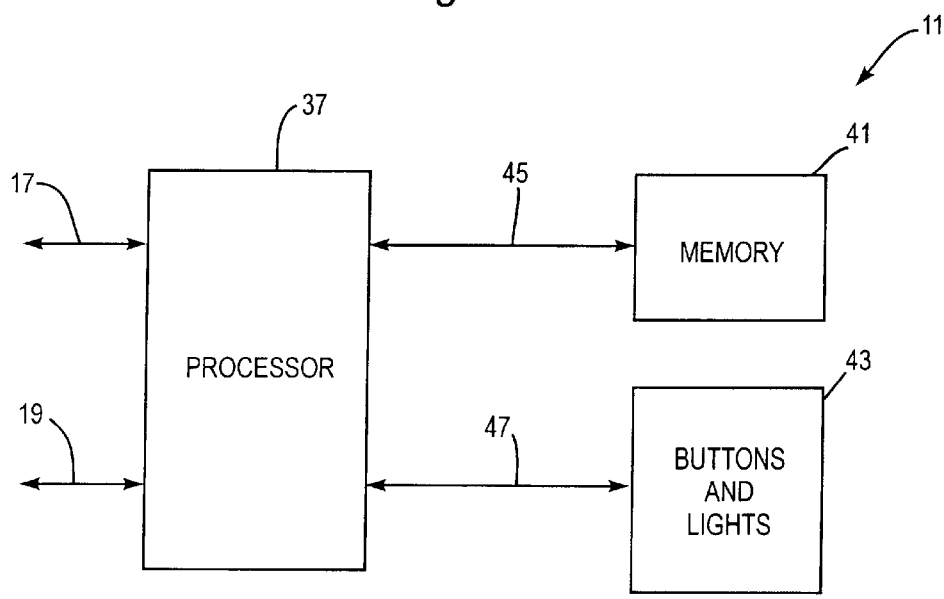
FIG. 3 is a block diagram of the structure of the invention.
Figure 4:
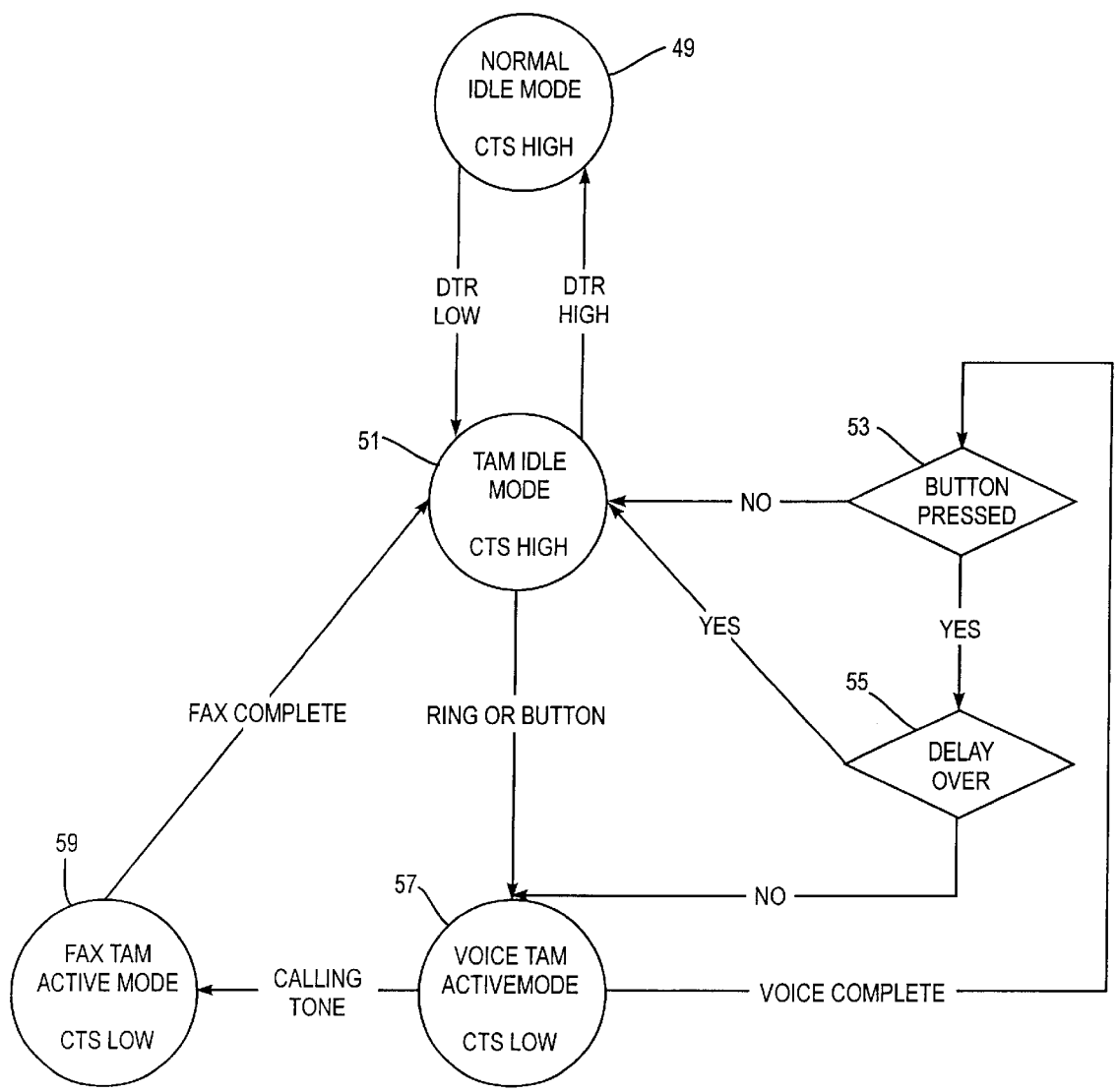
FIG. 4 is a flowchart showing operation of the invention during reception of a facsimile message by the apparatus of the invention.
Figure 5:
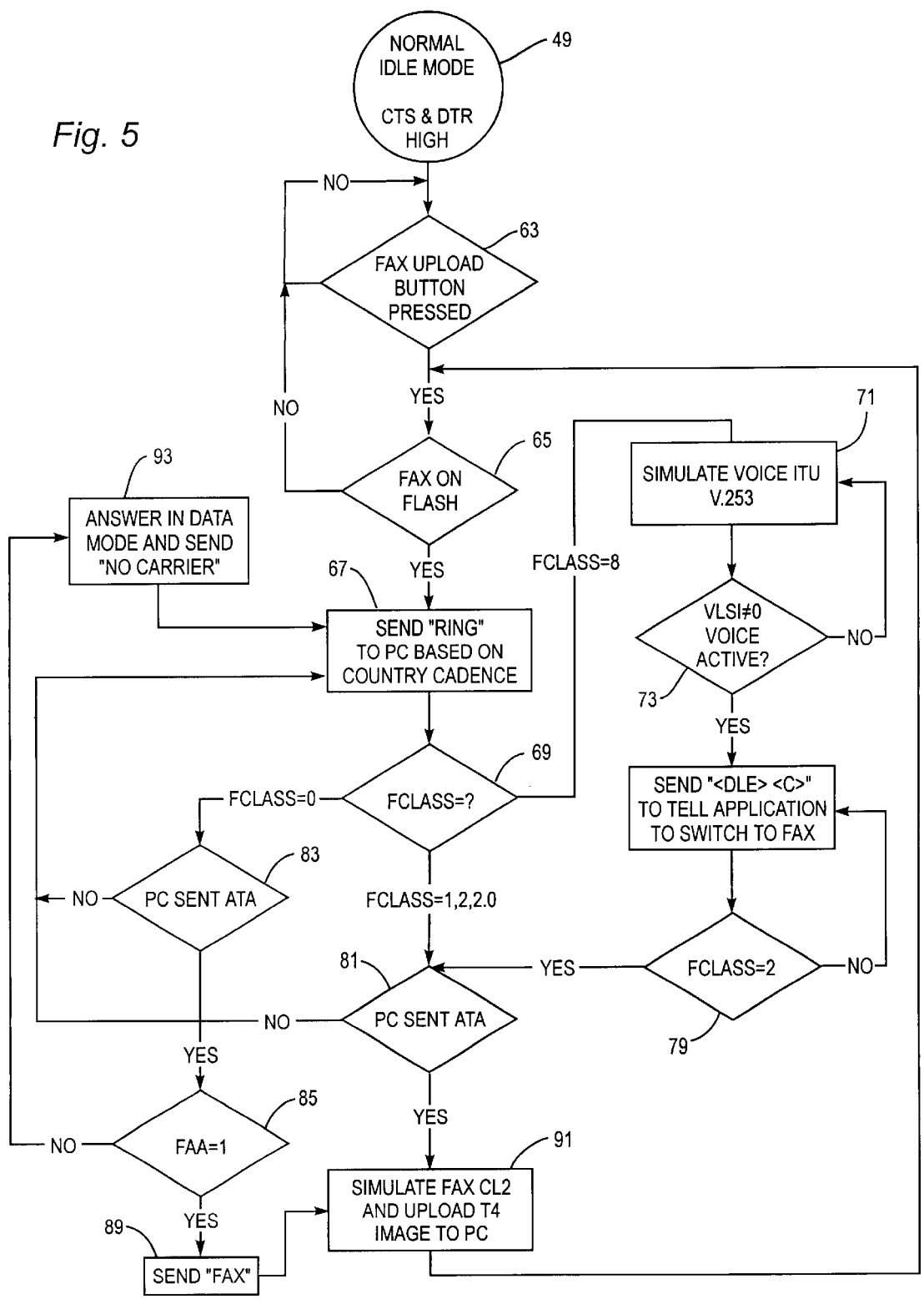
FIG. 5 is a flowchart showing operation of the invention during uploading of a stored facsimile message from the apparatus of the invention to the personal computer.

The standalone telephone answering machine with facsimile feature 11 according to the present invention is connected to a personal computer 13 over lines 17 through a DTE/DCE interface and to the switch network 15 over line 19 which follows ITU Group 3 FAX protocol. The standalone telephone answering machine and facsimile apparatus 11 preferably utilizes a full featured serial modem with V.90/K56 FLEX, facsimile Class 1 and 2, voice, and speakerphone capabilities.

The apparatus 11 has a user operable control panel 21 which contains a series of buttons 23–33 and light emitting diodes (LEDs) 35, 37. Since the telephone answering machine facsimile apparatus 11 is capable of recording voice messages, as well as facsimile messages, the buttons and lights of the user interface panel 21 allow the user to control the disposition of both voice and facsimile messages. Button 23, for example, controls the playing of voice messages. This button would cause the apparatus to playback stored voice messages. If a message is playing, the button stops such playback. Button 24, for example, causes the apparatus to stop playback of the current message and begin playing back the previous voice message. Button 25, for example, causes the apparatus to stop playback of the current messages and skip to the next voice message in line. Also, when the apparatus is in the idle mode, this button would cause the apparatus to enter the local handset command mode, if the handset is on-hook. Button 27, for example, causes the message that is currently being played to be deleted. Pushing the button twice within 2 seconds would delete all messages. Button 29, for example, causes the apparatus to record a message from the local microphone and store it as if it was an incoming voice message. Button 31, for example, permits the user to record an outgoing greeting. Button 33, for example, is the upload facsimile button. Pushing this button when the PC is running its facsimile application program, will cause any facsimile messages stored in the apparatus to be uploaded into the PC.

LED 35, for example, is the voice message LED. The voice LED blinks a number of times that is equal to the number of messages currently stored on the memory in the apparatus. Once a voice messages has been listened to, the voice LED will stop blinking even though there are additional voice messages stored in memory. After the voice LED stops blinking, the facsimile LED 37 will blink the number of times equal to the number of facsimile messages stored in the memory. After a facsimile message has been uploaded to the personal computer, the LED 37 will stop blinking. In addition, the facsimile messages stored in memory of the apparatus will be deleted, after being uploaded.

The hardware of the telephone answering machine facsimile message apparatus 11 consists of a processor 39, a memory 41, as well as the buttons and lights and associated circuitry 43. The processor 39 includes a standard fall featured serial modem of the V.90/K56 FLEX type, with facsimile Class 1 and 2, and voice, and speakerphone capability, as well as the software to direct the reception of facsimile messages over line 19 from the switched network, the transmission of facsimile messages from the personal computer, the storage of those facsimile messages in memory 41, and the uploading of those messages from memory 41 over line 17 to the personal computer 13.

The memory 41 is preferably a serial flash memory 15 megabits or larger, which is a two wire flash memory device, that preferably uses the NVM data pin for its data line and PC3 for its clock. These flash memory devices may be stacked serially to increase memory size. For example, if one flash memory device was used, the apparatus would be capable of recording fifteen minutes of audio or 35 facsimile pages. If two flash devices were used, the apparatus would be capable of recording 30 minutes of audio or 70 facsimile pages. The processor 39 addresses the buttons and lights 43 by reading whether the buttons are pressed and writing to the LEDs to cause them to blink.

The processor 39 of the telephone answering machine and facsimile message apparatus utilizes the hardware flow control signaling on line 17 normal to DTE/DCE interface protocol to determine if the modem is active. In the normal idle mode 49, the CTS signal is high and the DTR signal is high. With the DTR signal high, the modem behaves like a normal ACF modem. If the DTR signal goes low, the modem enters standalone telephone answering mode 51. If the modem is in telephone answering machine idle mode 51, in other words inactive, the DTR signal going high would transition the modem into normal idle mode 49.

When the modem is in telephone answering machine idle mode 51 and an incoming call is received, or a button on the apparatus is pressed, the modem will enter voice active mode 57. The CTS signal will be pulled low when the modem enters voice activate mode 57. Both the CTS and DTR signals are low in the voice active mode. If the personal computer selects a modem application program during the time that the apparatus is in voice active mode, the DTR signal will go high, but the application software will be unable to communicate with the modem because the CTS signal is still low. The application software in the PC will report an error message as a result, to notify the user that it was unable to talk to the modem. Once the voice active mode 57 is finished, CTS will go high and the application software is then free to use the modem.

When switching from telephone answering machine idle mode 51 to active mode 57, the voice data code is downloaded into DSP memory. If an external button 53, for example, was pressed to access the telephone answering machine mode, for example the play button, the modem will delay 55, for about 5 seconds after the command is over, before switching back to telephone answering machine idle mode 51 from the active mode 57. This delay allows the user to press another button within that 5 second window without having to redownload the voice data code. When the modem is in the telephone answering machine active mode 57 and a facsimile CNG calling tone is detected, the modem will switch to the facsimile active mode 59. When the modem switches to the facsimile active mode, normal POR data code is downloaded and stored in DSP memory. After the facsimile message has been completely received, the modem will switch directly back to the telephone answering idle mode 51.

With the modem in voice active mode 57, receipt of a facsimile calling tone CNG will automatically switch the modem into facsimile active mode 59 causing the modem to download FAX DSP code and switch to Class 2 protocol. The modem will then begin handshaking and receiving the facsimile message according to Group 3 FAX protocol. During this session, the Caller Id, CSI, TSI and FAX T4 information is saved on the flash memory 41. When the entire facsimile message has been received, the processor 39 will flash LED 37 to signal that a new facsimile message has been received and is in storage. Instead of switching to Class 2 protocol mode, the processor could be set up to switch to Class 1 or Class 2.0, just as well. Class 2 is preferred because it is the most widely used, and most facsimile application software is capable of Class 2 operation.

To retrieve a facsimile message from the standalone apparatus 11, a user will first have to open a facsimile voice application program on the personal computer 13 which is capable of operating with Class 2 protocol. In addition, the processor 39 must be in the normal idle mode 49 with both the CTS signal and the DTR (data terminal ready signal) are high. If the DTR signal is low, then the processor 39 is in the standalone idle mode 51.

With the application software running and in control of the processor 39 (DTR high) the user must then press the facsimile upload button 33. If the processor 39 senses that the fax upload button was pressed 63, it will then look in the flash memory 65 to determine if a facsimile message is present. Once having determined that a facsimile message is present in flash memory, the processor generates a simulated ring signal 67 to the personal computer 13, based on the country call progress profile being utilized. This simulated ring signal in the form of "RING" or <DLE><R> in voice mode alerts the application software on the computer 13 of an incoming facsimile message, even though the facsimile message is really only stored in the flash memory on the standalone apparatus 11, and is not coming in from the switched network 15.

The facsimile application software available on the market sets up the facsimile modem in different ways. Some application software sets up the modem in a FAX Adaptive Answer mode. Others utilize a Voice ADAPTIVE Answer mode. Some set up the modem for a FAX ONLY mode. Each mode utilizes a certain facsimile protocol (FCLASS). If the application software is utilizing a FAX ADAPTIVE Answer protocol, it will respond to the incoming ring signal by supplying an FCLASS=0 and FAA=1 command to the processor. If the software is set up for Voice Adaptive Answer, the application software will respond to the incoming ring signal by issuing an FCLASS=8 command. If the application software is set up for FAX ONLY, it will answer the incoming ring signal by sending back an FCLASS=2 command.

The processor determines 69 what FCLASS command is being returned to it. If the command is FCLASS=0, which means that the application software is set up for FAX Adaptive Answer protocol, the processor then looks for an ATA command 83 from the PC in answer to the incoming ring. If the ATA signal is detected, the processor looks for an FAA=1 command 85. (FAA being a FAX Adaptive Answer.) If an FAA=1 command 85 is detected, the modem will send a FAX message 89 to the computer 13. If the processor does not detect an ATA command 81 from the PC, it will simulate another ring command 67. If the processor does not detect an FAA=1 command, the processor will send a NO CARRIER command to the PC and another simulated ring signal 67. A NO CARRIER response by the processor in standalone apparatus 11 indicates that the application software is probably not set up correctly.

Assuming that the send FAX command 89 was sent by the processor to the personal computer 13, the application software is then ready to receive the facsimile. The processor will then simulate facsimile Class 2 protocol, faking all facsimile Class 2 protocol commands, including all the saved TSI, CSI and T4 information resulting in uploading 91 of the facsimile image to the PC. After the facsimile has been retrieved, the processor modem will delete the retrieved facsimile message from flash memory. This procedure will repeat until there are no more facsimile messages in the flash memory 65. Once all the messages are uploaded, the processor will go back to its normal idle mode 49.

If the application software is set up for a Voice Adaptive Answer mode, the application software will answer the simulated ring signal by a FCLASS=8 command. Upon the processor 39 detecting the FCLASS=8 command, the processor will simulate all voice functions 71 according to the ITU Group 3 FAX protocol. The processor will then look for a VLS command that is not θ from the application software. Upon receipt of this VLS signal, the processor will send a <DLE><C> signal 75 to the application software to simulate a facsimile calling tone to the facsimile application software. The application software will respond by sending a FCLASS=2 protocol command which is detected 72 by the processor 39. In addition, the application software in the PC will answer the facsimile calling tone by issuing an ATA command which is detected 81 by the processor. The processor will then begin simulating facsimile Class 2 operation, faking and negotiation all facsimile Class 2 commands, including all saved TSI, CSI and T4 information and uploading the facsimile message image stored in the flash memory 41 to the personal computer 91.

If the application software is set up for facsimile only, the application software will answer the incoming ring 67 by switching to FCLASS=2 protocol 69 and issuing an ATA command which is detected by the processor 81 in the standalone unit. At this point, the processor will begin simulating facsimile Class 2 protocol 91 and upload the facsimile message stored in the flash memory to the PC.

This process will be repeated as long as there are facsimile messages left to upload in flash memory. Once all stored facsimiles have been upload and erased, one by one, as they are uploaded, the application software will issue an ATH command to hang up. The standalone apparatus 11 will then go back to its normal idle mode 99 with its CTS and data terminal ready (DTR) signals high.

What is claimed is:

1. A store and forward standalone facsimile apparatus connected between a computer running a facsimile application software program and a switched network, the apparatus comprising:
    a memory for storing facsimile messages received from the switched network;
    a manually actuable button for initiating transfer of a stored facsimile message to the computer; and
    a processor configured to:
        direct storage of an incoming facsimile message in the facsimile memory;
        determine what facsimile protocol the computer is using; and
        transfer the stored facsimile message to the computer in accordance with the determined facsimile protocol upon activation of the button by the user.

2. The apparatus of claim 1 further comprising a light, actuable by the processor upon storage of a facsimile message in the facsimile memory to indicate presence of a facsimile message.

3. The apparatus of claim 1 wherein the processor causes generation and sending of a simulated ringing signal to the computer in response to the button being pressed to alert the facsimile application software running on the computer that a facsimile message is to be transferred.

4. The apparatus of claim 3 wherein the facsimile application software responds to the ringing signal with an acknowledgement signal.

5. The apparatus of claim 1 wherein the application software simulates Class 2 facsimile protocol and uploads the facsimile message from the standalone facsimile apparatus to the computer.

6. The apparatus of claim 1 wherein the memory is a flash memory that stores voice messages and facsimile messages.

7. The apparatus of claim 6 wherein the flash memory is a two wire serial flash memory.

8. The apparatus of claim 2 wherein the light is a light emitting diode.

9. In a store and forward standalone facsimile apparatus containing a processor with modem functions connected between a computer running facsimile application software and a switched network, a method for receiving and storing facsimile messages from the switched network when the facsimile application software is not active, the steps of the method comprising:
    entering active mode upon receipt of a call or upon a button being pushed on the standalone apparatus;
    switching to facsimile active m ode upon a facsimile calling tone being detected;
    downloading to memory in the facsimile apparatus data representing a facsimile message from the switched networks;
    sending a ring signal to the computer;
    receiving an acknowledgement signal from the computer in response to the ring signal;
    determining what type of facsimile protocol the computer is using, based at least in part on the received acknowledgement signal; and
    transferring the data from memory to the computer in accordance with the determined facsimile protocol.

10. The method of claim 9, further comprising the step of delaying for a short period of time before switching from active mode to passive mode after a button on the standalone apparatus is pushed.

11. In a store and forward standalone facsimile apparatus containing a processor with modem functions and a memory, the apparatus being connected between a computer running an application facsimile software program and a switched network, a method for uploading the computer facsimile messages received from the switched network and stored in the memory of the apparatus, the steps of the method comprising:
    detecting a facsimile upload button on the apparatus being pushed;
    verifying that a facsimile message is stored in the memory of the apparatus;
    sending a simulated ring signal to the computer;
    detecting a ready command from the computer in response to the ring signal;
    determining what facsimile protocol the computer is using; and
    uploading the facsimile message stored in memory of the apparatus to the computer, in accordance with the determined facsimile protocol.

12. The method of claim 11 wherein the determining step comprises determining whether the computer is set for Class 1 or Class 2 facsimile protocol.

13. The method of claim 11 wherein the determining step comprises determining whether the computer is set for Class 2.0 facsimile protocol.

14. The method of claim 12 or 13 further comprising switching to Class 2 protocol if the computer was set for Class 1 or Class 2.0 protocol.

15. The method of claim 11 wherein the determining step comprises determining whether the computer is set for FAX Adaptive Answer, a Class 0 protocol.

16. The method of claim 15, further comprising, in the event the computer is set for FAX Adaptive Answer:

detecting a ready command from the computer in response to the ring signal;

if no ready command from the computer is detected, sending another simulated ring signal;

if a ready command is detected, detecting an FAA=1 command from the computer;

if no FAA=1 command is detected sending a NO CARRIER command to the computer to the computer and another simulated ring signal;

if an FAA=1 command is detected, uploading the facsimile message from the apparatus to the computer.

17. The method of claim 16 further comprising after the FAA=1 command step, sending a SEND FAX command to the computer.

18. The method of claim 11 wherein the determining step comprises determining whether the computer is set for Voice Adaptive Answer, a Class 8 protocol.

19. The method of claim 18, further comprising, in the event the computer is set for Voice Adaptive Answer:

sending a simulated ring signal to the computer using Group 3 FAX protocol;

detecting a command from the computer in response to this simulated ring signal;

sending a facsimile calling tone to the computer;

detecting a Class 2 protocol identifying signal from the computer;

detecting a ready command from the computer that it is ready to upload the facsimile message; and uploading the facsimile message from memory of the standalone apparatus to the computer.

20. The apparatus of claim 4, wherein the processor is further configured to receive the acknowledgement signal and determine what type of facsimile protocol the computer is using based at least in part on the received acknowledgement signal.

* * * * *